Nov. 10, 1959    HIROSHI SUZUKAWA    2,912,181
FILM REWINDING MEANS IN PHOTOGRAPHIC CAMERAS
Filed Jan. 3, 1957    2 Sheets-Sheet 1

INVENTOR.
HIROSHI SUZUKAWA
BY

ATTORNEY

Nov. 10, 1959  HIROSHI SUZUKAWA  2,912,181
FILM REWINDING MEANS IN PHOTOGRAPHIC CAMERAS
Filed Jan. 3, 1957  2 Sheets-Sheet 2

INVENTOR.
HIROSHI SUZUKAWA
BY
ATTORNEY

United States Patent Office 2,912,181
Patented Nov. 10, 1959

2,912,181

FILM REWINDING MEANS IN PHOTOGRAPHIC CAMERAS

Hiroshi Suzukawa, Tokyo, Japan, assignor to Canon Camera Company, Inc., Tokyo, Japan, a corporation of Japan Application January 3, 1957, Serial No. 632,316

Claims priority, application Japan April 17, 1956

5 Claims. (Cl. 242—71.6)

This invention relates to a film rewinding means in photographic cameras, and more particularly to a film rewinding means having a crank handle for modern miniature roll film cameras.

An object of the instant invention is to provide a most convenient rewinding means for exposed film, that is, a rewinding means of simple but rapid operation.

Another object is to provide a film rewinding means having a clutch between the crank handle and the shaft engaging the film spool so that rotation of the latter while the film is wound upon the take-up spool preparatory to making an exposure has no effect on the crank handle in its inoperative position, which clutch, on throwing the crank handle into its operative position, couples such handle and the spool shaft.

Still another object of the invention is to so construct a film rewinding means and the clutch thereof that axial movement of the film spool or the driving fork of the rewind mechanism is prevented while the camera housing is closed.

Conventional cameras are in general provided with a rewinding knob with some of them, of more modern design, employing a crank handle to provide rapid rewinding of the exposed film. In prior known mechanisms, the crank handle is directly affixed to a fork engaging a protrusion or extension of the film spool, the crank handle being provided for manually rotating the spool for rewinding exposed film upon it. In some cameras, the rewinding crank extends beyond the camera housing or body spoiling the appearance of the camera. Moreover, the extending crank often becomes a troublesome nuisance by catching the sleeve of the user's clothes or the strap of the camera case while the camera is in use. For these reasons, the dimensions of the rewinding cranks of miniature cameras are limited to relatively small sizes. In some cameras, to avoid projecting cranks, etc., the rewind mechanism is provided with a disk at the upper end of the film rewinding sleeve projecting outside the camera body, of a radius equal to that of the conventional rewinding knob, with a crank handle hinged to the disk and recessed, when not in use, in a circular groove in the disk, the crank handle being erected to rewind film. Crank handles of this type are of necessity of relatively small size and, due to their relatively small arm, do not provide the desired rapid rewind of exposed film.

The aforementioned, and other, objects and features of the invention are met by providing a relatively long arm of rotation thus resulting in convenient and rapid rewinding of exposed film. The crank handle of the rewinding mechanism of the instant invention is normally recessed in the upper face of the camera top while not in use, and erected to the operating position for rewinding exposed film. When the crank handle is in its inoperative position, the sleeve engaging with the film spool is disconnected from the crank handle by opening a clutch therebetween, whereas when the crank handle is swung upwardly out of its recess an operative connection is automatically established by engagement of the clutch. Furthermore, a film winding indicator is provided at the top face of the rewinding sleeve to indicate winding movement of the film. When the back wall of the camera is closed, after loading film into the camera, the film rewinding sleeve is locked to prevent its axial extraction. The locking device thereof is operatively connected with the camera cover which is opened and closed when a roll of film is loaded or unloaded, and the rewinding sleeve can be pulled out to disconnect the rewinding sleeve from the film spool or cassette only when the back wall is open.

A clearer concept of the scope and purpose of the instant invention may be obtained from the following description of an illustrative embodiment thereof, and the accompanying drawing, in which.

Figure 1:
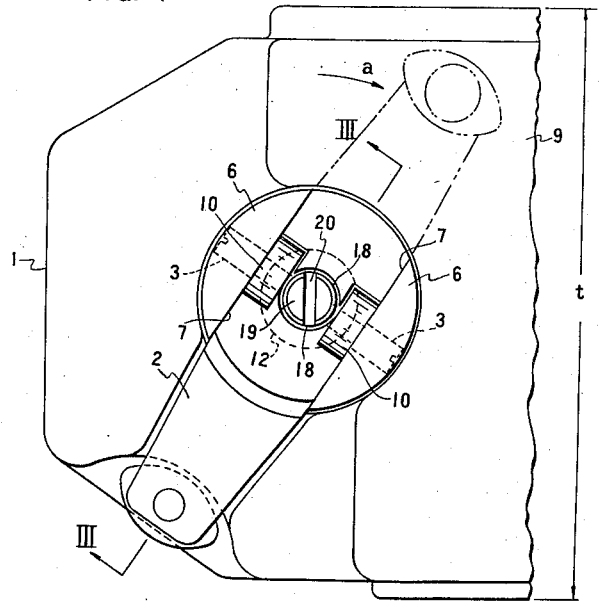
Fig. 1 is a plan view of a film rewinding crank according to this invention.
Figure 3:
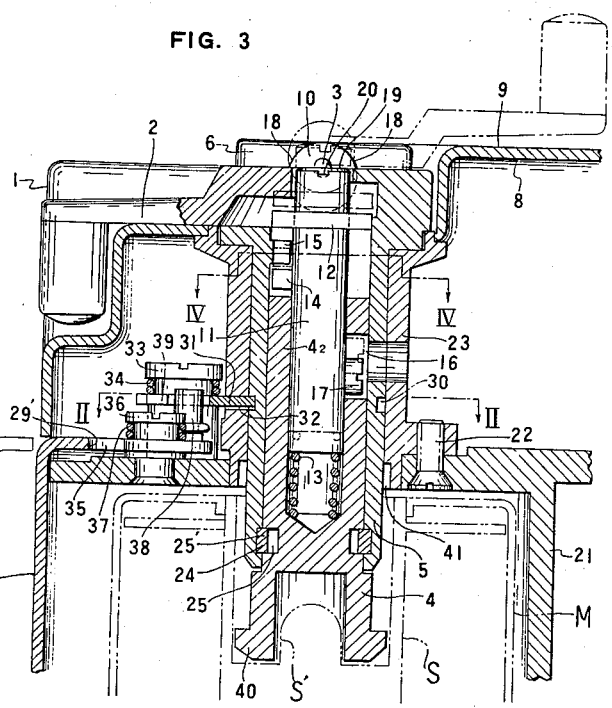
Fig. 3 is a vertical sectional view along the line III—III of Fig. 1.
Figure 4:
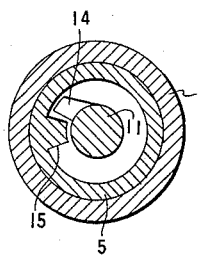
Fig. 4 is a cross section along the line IV—IV of Fig. 3 to show the clutch mechanism.

Now referring to the accompanying drawing, particularly to Fig. 1 and Fig. 3, a long crank handle 2 of about half the thickness of camera body 1 is hinged by shaft 3 to the rewinding sleeve 5 which is provided with a groove 7 between diametrically opposite segmental bearings 6 and 6 at the upper end of a sleeve 5. A tubular portion $4_2$ of the upper region of a fork 4 is telescopically supported in sleeve 5. The upper surface of segmental bearings 6 and 6 is designed almost flush with the upper surface 9 of cover 8, and crank handle 2 is recessed in the cover 8 to prevent it from catching into the clothing of the user or the camera strap. Thus this construction presents a nice appearance notwithstanding its large crank handle.

A cam 10 is provided as a unit about the pivot center of crank handle 2. When crank handle 2 is folded in, as shown in full line in Fig. 3, disk 12 at the upper end of clutch rod 11, telescopically mounted within tubular portion 42 of fork 4, is depressed by cam 10 of crank handle 2 to press clutch rod 11 down against the tension of a spring 13 and disengage a projection 15 on sleeve 5 from another projection 14 integrally formed on clutch rod 11. Thus when spool S, within magazine or cassette M, rotates by winding the film after an exposure, fork 4 likewise rotates by engaging protrusion S' of the spool. The clutch rod 11 is rotated with fork 4 by means of groove 16 in the tubular portion of fork 4 and pin 17 on the rod, while sleeve 5 and crank handle 2 remain unrotated at rest since clutch members 14 and 15 are disengaged. The upper end 19 of clutch rod 11 projects upwardly through annular aperture 18 formed between the upper part of sleeve 5 and the central region of crank handle 2, so that indication of film feeding is given by the rotation of indicator 20 provided at the top of rod 11.

When crank handle 2 is erected, by rotations through 180° about its horizontal pivot shaft, as shown in chain line in Fig. 3, cam 10 rotates 180° around shaft 3 and releases the pressure against disk 12 to raise clutch rod 11 upwardly by the tension of spring 13 to engage projection 14 with projection 15. And when crank handle 2 is turned in the direction of arrow $a$ shown in Fig. 1, the rotation is eventually transmitted to sleeve 5, projections 15 and 14, clutch rod 11, pin 17, elongated groove 16 and fork 4, thus rewinding the film by virtue of the rotation of spool S. The sleeve 5 thus rotates smoothly within bearing 23 secured to frame 21 by means of screws 22.

Figure 5:
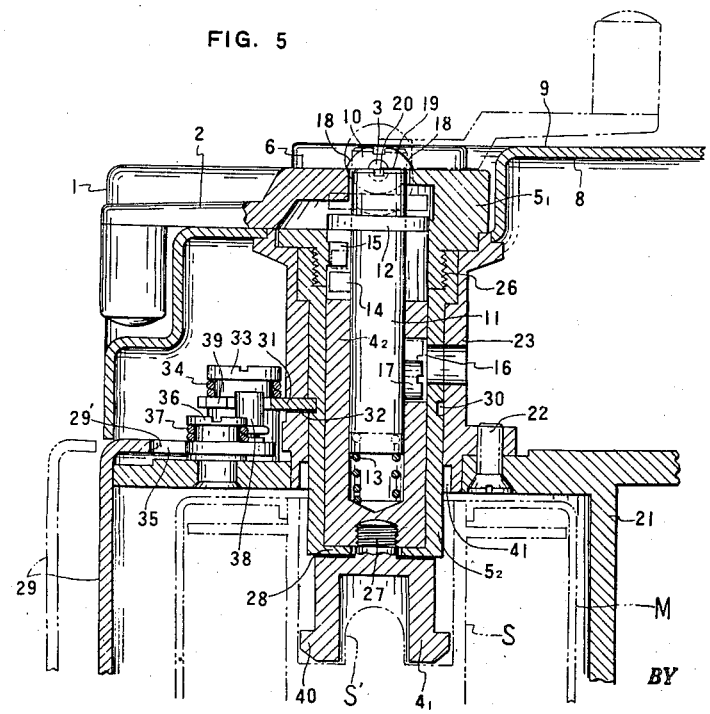
Fig. 5 is a longitudinal section of a modified embodiment.

In the embodiment illustrated in Fig. 3, fork 4 and sleeve 5 are telescopically mounted relative to each other and a piston ring like spring ring 24, with a circumferential portion thereof cut away, is sprung into grooves 25 and 25' facing each other between fork 4 and sleeve 5 to prevent their axial displacement. For ease of assembly, this structure may be modified as illustrated in Fig. 5, in which the sleeve is separated into head portion $5_1$ and tubular portion $5_2$, joined by screw 26, the fork also being of two-part construction, fork $4_1$ per se and tubular portion $4_2$ joined together by screw 27, a flange 28 at the bottom of tubular portion $5_2$ supporting the bottom surface of tubular portion $4_2$ to prevent relative axial displacement between them. The structure and function of other structural elements are designed substantially similar to those shown in Fig. 3.

Figure 2:
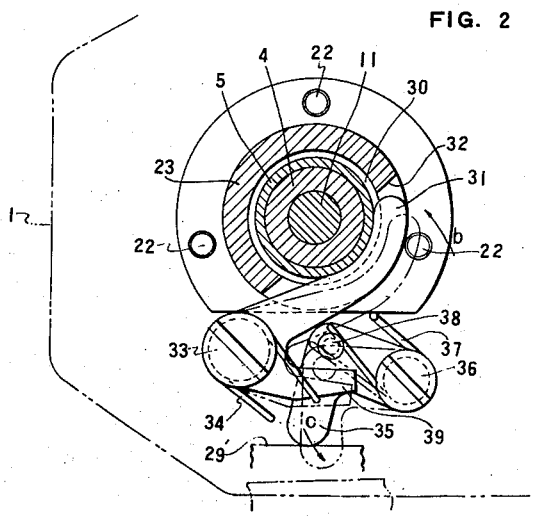
Fig. 2 is a horizontal cross section along the line II—II of Fig. 3 to illustrate the locking mechanism of the fork.
Figure 2:

Cameras having bottom covers do not need a fork movable in its axial direction because in such cameras the magazine or cassette M is loaded or unloaded from the camera bottom. While cover 29 is constructed as of the hinged back wall type in the embodiments shown in Figs. 3 and 5, fork 4 must necessarily be withdrawable in the axial direction to clear the top of magazine M. In the embodiment according to the instant invention the fork is retractable only when rear cover 29 is opened. To explain more particularly, the sleeve is mounted telescopically in bearing 23, and locking lever 31 engages with annular groove 30 (Fig. 2) through an aperture 32 in the cylindrical wall of bearing 23, lever 31 being pivoted to frame 21 by screw 33. The locking lever 31 is biased inwardly at all times to engage with groove 30 as shown by the arrow $b$ by spring 34, Fig. 2, when the back wall 29 is closed. A lever 35 swings about its pivotal screw 36 pushed by the pressure of back wall limb 29' and is biased constantly to project outwardly in the direction of the arrow $c$ by spring 37. Thus when lever 35 turns outwardly on opening the back wall, locking lever 31 turns simultaneously. For this particular purpose, a pin 38 is provided on lever 35 and an engaging arm 39 on lever 31; spring 37 being more powerful than spring 34.

The locking mechanism works as follows: When the back wall 29 is closed, lever 35 is swung clockwise by limb 29' to disengage pin 38 from engaging arm 39 against the tension of spring 37. The locking lever 31 turns in the direction of the arrow $b$ by spring 34 to engage annular groove 30, and sleeve 5 is rotatable but immovable in the axial direction and thus prevents accidental removal of fork 4 from engagement with spool S while the cover is closed. When cover 29 is opened, limb 29' releases lever 35 which now turns in the direction of the arrow $c$ and pin 38 eventually pushes support arm 39 to disengage locking lever 31 from aperture 32 and annular groove 30. Sleeve 5 is now slidable relative to bearing 23 and radial projection 40 of fork 4 may be moved upwardly into groove 41 thus clearing the upper end of magazine M, to permit removal of the magazine or cassette from the camera. It will readily be noted that the arrangement of levers 31 and 35 allows sleeve 23 to be lowered to position lever 31 in aperture 32 and to engage the fork to a replacement spool, if one has been inserted into the camera, even after the cover is closed.

I claim:

1. In a roll film camera having a case with a removable cover and a film magazine for holding a film spool, a rewinding mechanism comprising, a bearing in the camera case, a sleeve axially movable and rotatable within the bearing, an elongated crank pivoted to an end of the sleeve and movable between an inoperative position and an operative position, a recess in the camera case for receiving the handle in its inoperative position, a cam movable with said handle, a fork member telescopically received within the sleeve for rotating the film spool, a clutch rod telescopically received within the fork member and the sleeve and biased upwardly to cooperate with the cam, cooperating clutch members on the clutch rod and on the sleeve adapted to be disengaged when the handle is in its inoperative position and the clutch rod is held in its lowermost position by the cam and to be engaged when the handle is moved into its operative position upon the biased upward movement of the clutch rod permitted by the cam, and driving means between the clutch rod and the fork for rotating the film spool when the handle is rotated while in its operative position.

2. The rewinding mechanism according to claim 1 including a spring ring, said sleeve and said fork being formed with opposing annular and peripheral grooves respectively for receiving the spring ring to prevent relative axial displacement of the fork and sleeve.

3. The rewinding mechanism according to claim 1, wherein the upper end of the clutch rod extends through openings provided in the sleeve and crank, and an indicator on the exposed end of the rod to provide a visual indication of the film feeding.

4. The rewinding mechanism according to claim 1, including a latching member cooperating with the sleeve to prevent axial movement thereof, and a trip member for unlatching the latching member when the cover is removed to permit withdrawal of the film spool.

5. The rewinding mechanism according to claim 4, including radial projections on the lower end of the fork, and longitudinal grooves in the bearing to permit limited axial withdrawal of the sleeve, rod and fork for removal of the film spool when the latching member is unlatched.

References Cited in the file of this patent

UNITED STATES PATENTS

| | | |
|---|---|---|
| 2,165,060 | Krug | July 4, 1939 |
| 2,245,214 | Mihalyi | June 10, 1941 |